United States Patent
Bloemker

(10) Patent No.: US 10,376,726 B2
(45) Date of Patent: *Aug. 13, 2019

(54) FIREFIGHTING TRAINING UNIT

(71) Applicant: Shawn C. Bloemker, Godfrey, IL (US)

(72) Inventor: Shawn C. Bloemker, Godfrey, IL (US)

(*) Notice: Subject to any disclaimer, the term of this patent is extended or adjusted under 35 U.S.C. 154(b) by 188 days.

This patent is subject to a terminal disclaimer.

(21) Appl. No.: 15/647,710

(22) Filed: Jul. 12, 2017

(65) Prior Publication Data

US 2017/0326397 A1 Nov. 16, 2017

Related U.S. Application Data

(63) Continuation of application No. 14/161,074, filed on Jan. 22, 2014, now Pat. No. 9,707,424.

(51) Int. Cl.
*A62C 99/00* (2010.01)
*G09B 9/00* (2006.01)

(52) U.S. Cl.
CPC ............ *A62C 99/0081* (2013.01); *G09B 9/00* (2013.01)

(58) Field of Classification Search
CPC ....... A62C 99/0081; G09B 9/00; G09B 19/00
USPC ........................................................ 434/226
See application file for complete search history.

(56) References Cited

U.S. PATENT DOCUMENTS

| | | | |
|---|---|---|---|
| 2,118,338 A | 5/1938 | Bolhuis | |
| 2,635,359 A | 4/1953 | Broscious | |
| 3,924,376 A | 12/1975 | Tsurumi | |
| 5,167,560 A | 12/1992 | Lubiniecki | |
| 5,203,707 A | 4/1993 | Musto et al. | |
| 5,862,931 A * | 1/1999 | Cox | B65D 11/1893 206/508 |
| 5,927,990 A | 7/1999 | Welch et al. | |
| 6,179,620 B1 | 1/2001 | Schmid | |
| 6,524,107 B1 | 2/2003 | Brown | |
| 6,889,473 B2 | 5/2005 | Westra | |
| 7,074,043 B1 | 7/2006 | Jacobson | |
| 7,493,731 B2 | 2/2009 | Zhang | |
| 7,823,357 B2 | 11/2010 | Westra | |
| 8,048,505 B1 | 11/2011 | Reaney | |

(Continued)

FOREIGN PATENT DOCUMENTS

| | | | |
|---|---|---|---|
| GB | 2294572 A | 5/1996 | |
| GB | 2339955 A * | 2/2000 | ......... A62C 99/0081 |
| NL | 1003574 | 6/1997 | |

OTHER PUBLICATIONS

"PPE in Flashover Simulators and Burn Buildings," Jeffrey O. and Grace G. Stull, https://www.firerecruit.com/articles/897721-PPE-in-flashover-simulators-and-burn-buildings, Oct. 21, 2010.*

(Continued)

*Primary Examiner* — Samchuan C Yao
*Assistant Examiner* — Jennifer L Korb
(74) *Attorney, Agent, or Firm* — Grace J. Fishel

(57) ABSTRACT

A metal container with a combustible liner for use as a portable firefighting training unit. The combustible liner is formed of particle board sections loosely assembled inside the metal container with an opening in the liner in registry with an access opening in the metal container. The unit may be used to demonstrate various phenomena associated with a developing fire including the flammability of unburned products of combustion, hose stream techniques with a spray bottle filled with water, flashover and backdraft.

10 Claims, 3 Drawing Sheets

(56) References Cited

U.S. PATENT DOCUMENTS

| | | | |
|---|---|---|---|
| 2008/0029527 A1* | 2/2008 | Woinarski | B65D 43/0256 |
| | | | 220/782 |
| 2009/0159592 A1* | 6/2009 | Vitalis | B65D 88/125 |
| | | | 220/1.5 |
| 2009/0188188 A1 | 7/2009 | Rivet | |
| 2010/0326993 A1* | 12/2010 | Mayer | B65D 81/3825 |
| | | | 220/592.27 |

OTHER PUBLICATIONS

"Burning Down the (Dolls) House: Small Scale Compartment Fire Demonstrations," CFBT, http://web.archive.org/web/20110924231620/http://www.cfbt-us.com/pdfs/revised_dh_plans_v3.pdf, Sep. 24, 2011.*

"Live Fire Training Fatalities," Ed Hartin, http://web.archive.org/web/20101022052629/http://cfbt-us.com/wordpress/?tag=add-new-tag, Oct. 22, 2010.* http://www.cfbt-us.com/pdfs/revised_dh_plans_v3.pdf Copyright unknown but admitted prior art.

International Search Report and Written Opinion of the International Searching Authority in International application No. PCT/US2015/012374 filed Jan. 22, 2015.

* cited by examiner

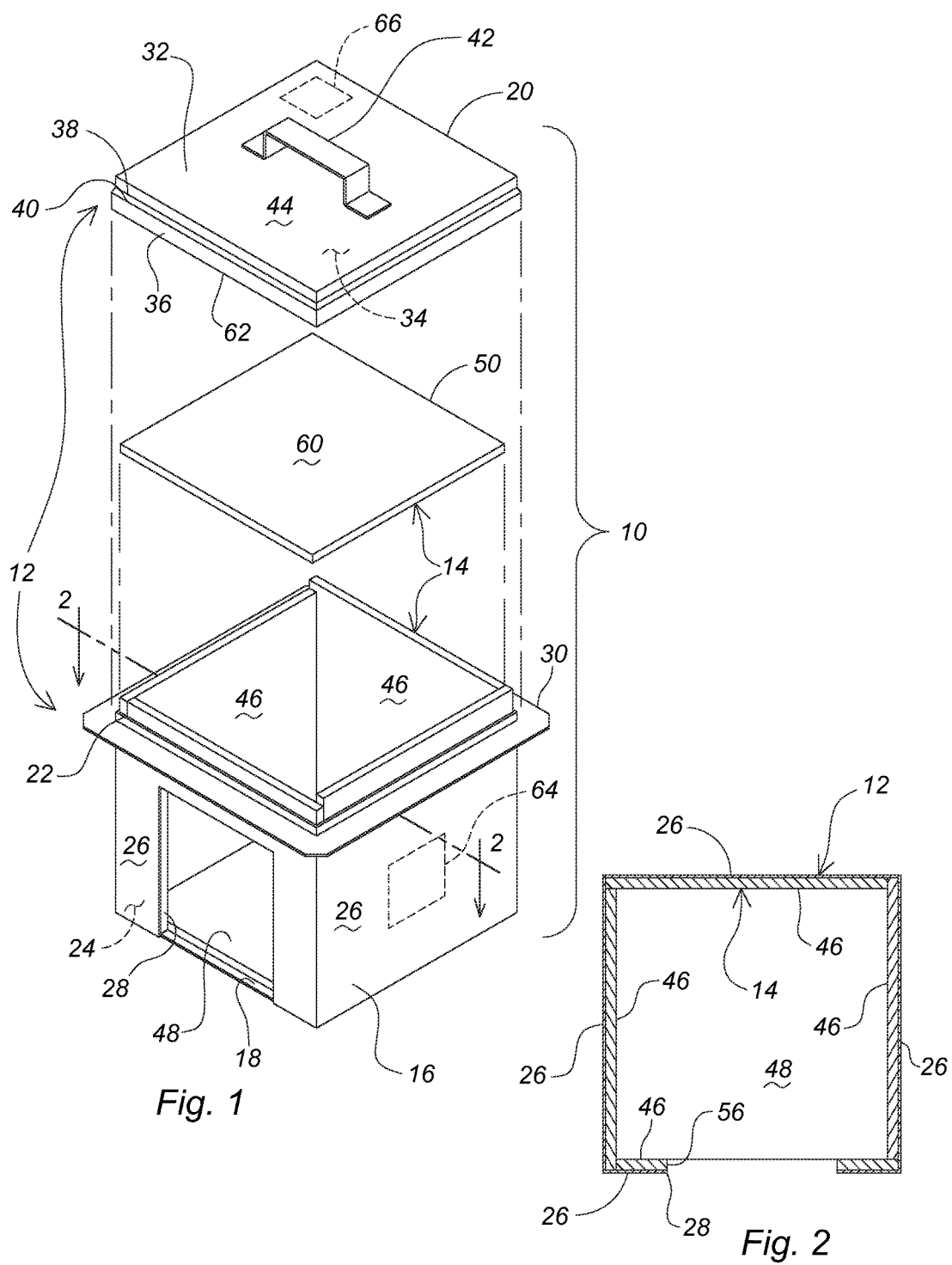

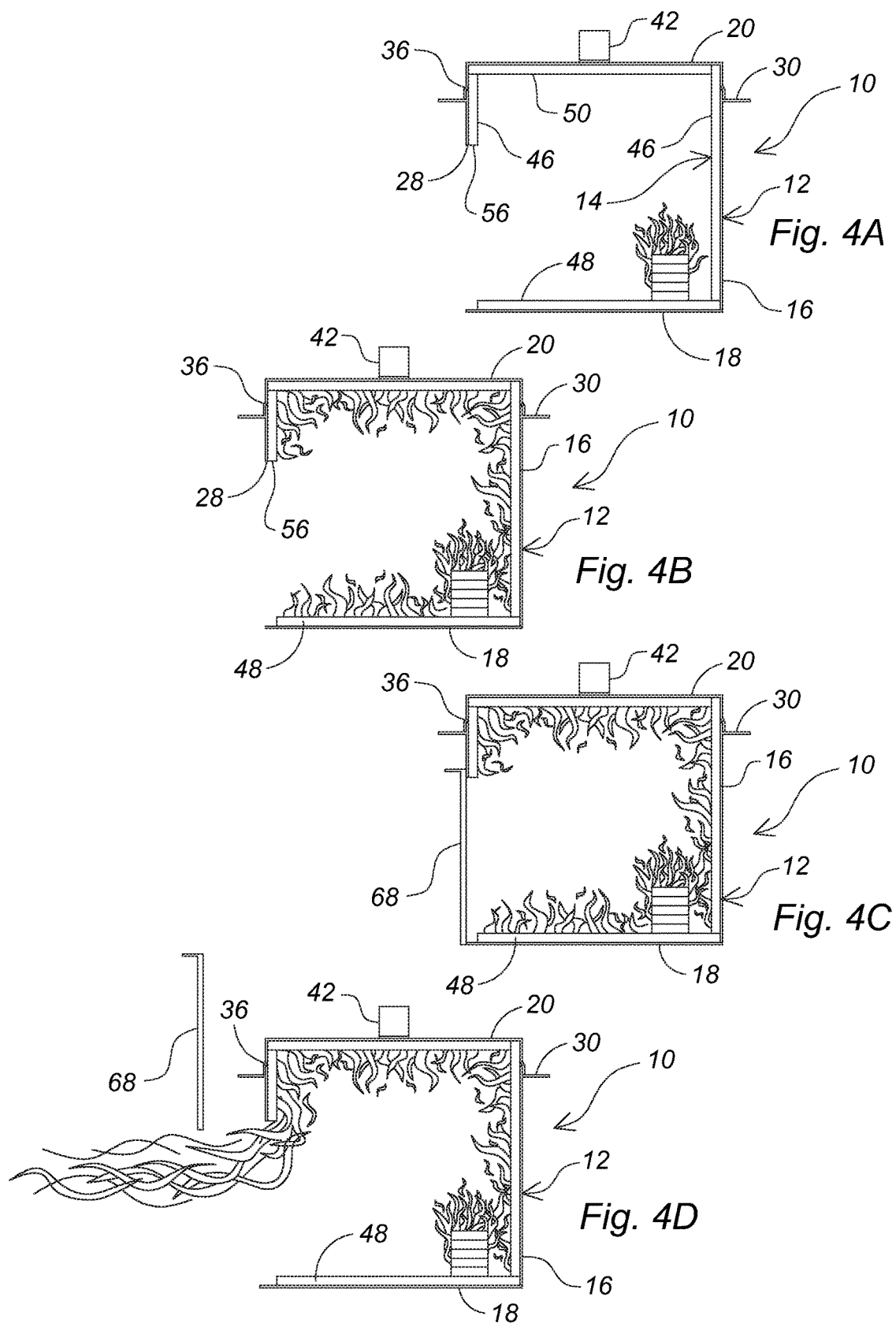

FIREFIGHTING TRAINING UNIT

BACKGROUND OF THE INVENTION

1. Field of the Invention

The present invention relates to a portable firefighting training unit which can be used to demonstrate the progression of a fire including flashovers and backdrafts.

2. Brief Description of the Prior Art

The hazards of flashover, backdraft, smoke explosion and other forms of fire gas ignition need to be taught to firefighters. For this purpose steel shipping containers are frequently used to provide firefighters with the necessary understanding of fire behavior. In use, the container is loaded at one end with Class A combustibles with open and shut vents added to control air flow. Inside these cells, the firefighters may view the early stages of fire growth and examine first hand the production of unburned products of combustion combining with flammable gases given off by the pyrolyzing combustibles. They may witness the transformation of smoke to flame as pockets of unburned fuel in the smoke reach ignition and turn to flame. As the demonstration progresses, the firefighters may observe a flashover in the fuel-loaded end of the cell, witnessing the sudden but sustained transition from a developing to a fully developed fire. Variations on the shipping container have been designed, some of which are patented, and are used to demonstrate door entry techniques and backdraft.

The above mentioned equipment is very effective at training but is not available for training all firefighters including those belonging to volunteer departments because of cost, time and/or logistics. According to the National Fire Protection Association's U.S. fire department profile, about 70% of all firefighters in America are volunteers and the majority of career and volunteer fire departments having a limited training budget. Hence the number of firefighters possibly in need of training is not insignificant.

There are field training programs for firefighters and one of the pieces of equipment used for field training is what is called a "dolls house." The components of the "dolls house" are cut from particle board and then glued or stapled together. The joints must be tight as the purpose of the prop is to simulate a single compartment fire with a single ventilation point. Making the dolls house is tedious and a new one must be constructed for each demonstration as it is burned. It would therefore be desirable to have a burnable teaching prop that is portable for field use but that does not need to stapled or glued together and is not expensive.

BRIEF SUMMARY OF THE INVENTION

In view of the above, it is an object of the present invention to provide a small scale firefighting training unit that is easy to assemble. It is another object to provide a training unit that is small enough that it can be carried by an instructor for field training of firefighters. Another object is to provide a training unit that is relatively inexpensive and therefore available for training firefighters belonging to career and volunteer departments. Other objects and features of the invention will be in part apparent and in part pointed out hereinafter.

A portable firefighting training unit in accordance with the present invention includes a metal container with a combustible liner. The metal container has an outer wall, a bottom wall and a lid. The outer wall has a top edge and a bottom edge, with the bottom edge joined to the bottom wall to define an open cavity. An access opening is provided in the outer wall along the bottom wall and a peripheral flange is provided below the top edge. The lid has a top panel with a skirt and the skirt has an inner perimeter and an outer inner perimeter.

The combustible liner is formed from a plurality of side panels, a bottom panel and a top panel. The bottom panel is fitted inside the outer wall of the metal container resting on the bottom wall of the metal container. The side panels have an upper edge and a lower edge with the lower edge of the side panels resting on the bottom panel. The side panels are loosely butted together against the outer wall of the metal container and one of said side panels has an opening in registry with the access opening in the outer wall of the metal container. The upper edge of the side panels extends above the top edge of the outer wall of the metal container and the top panel rests on the upper edge of the side panels.

The combustible liner is fitted inside the inner perimeter of the skirt of the lid and the outer wall of the metal container is fitted inside the outer inner perimeter of the skirt with a lower edge of the skirt resting on the peripheral flange of the outer wall. In this position, an air pathway to the combustible liner is blocked other than through the access opening in the outer wall of the metal container.

In some embodiments the metal container is formed of sheet steel and the liner is formed of particle board and in other embodiments a cover is provided for blocking the air pathway through access opening. Some embodiments include a handle on an outer surface of the lid or where the metal container is cuboidal. Still further embodiments include additional access openings to simulate a window or a roof vent.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is an exploded perspective view of a portable firefighting training unit in accordance with the present invention, the unit including a metal container with a combustible liner;

FIG. 2 is a cross-section taken along the plane of 2-2 in FIG. 1;

FIGS. 4A through 4D demonstrate various phenomena associated with a developing fire in the training unit.

DETAILED DESCRIPTION OF THE INVENTION

Figure 3:
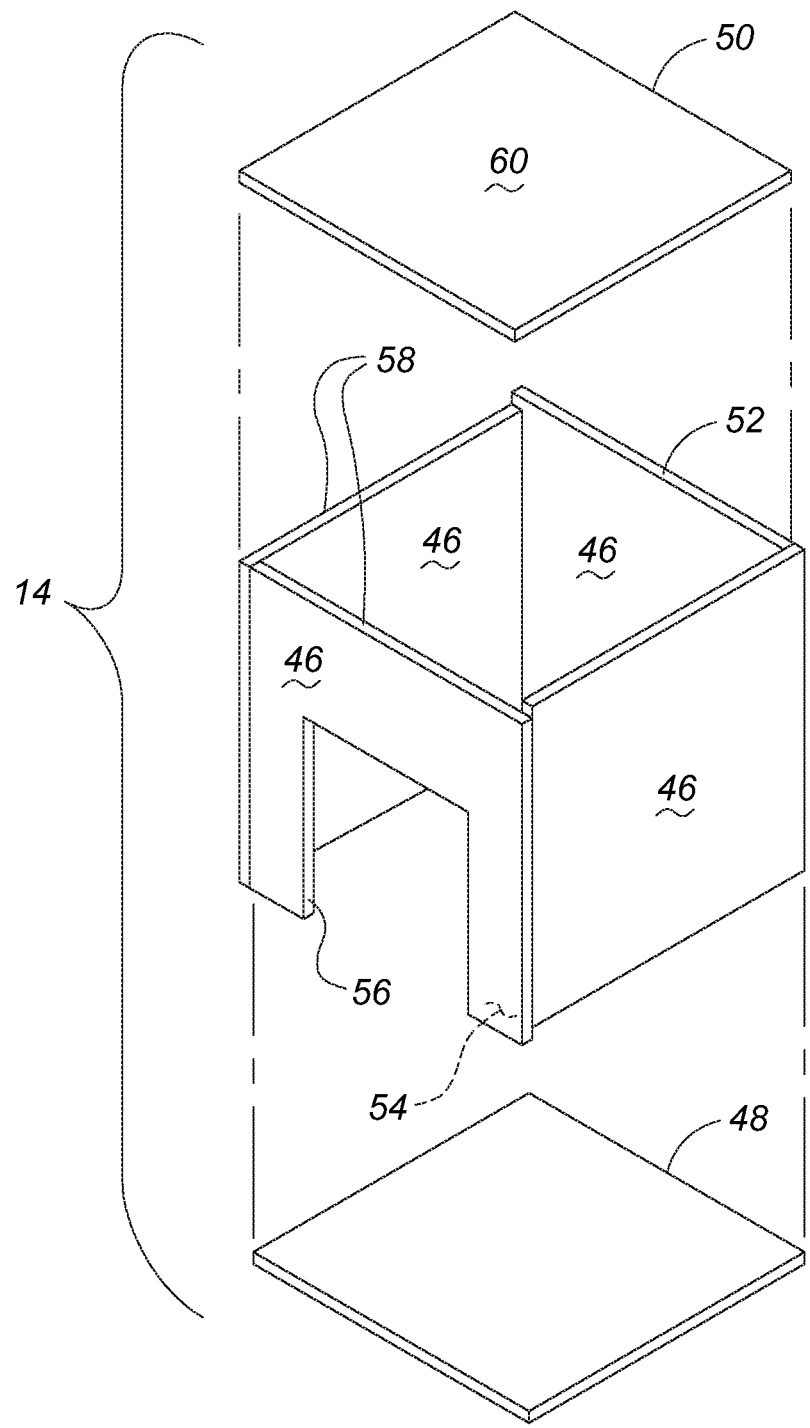
FIG. 3 is an exploded perspective view of the combustible liner.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the drawings more particularly by reference character, reference numeral 10 refers to a portable, small scale firefighting training unit in accordance with the present invention. In major part, unit 10 includes a metal container 12 and a combustible liner 14. While unit 10 is illustrated as a one-compartment simulator, it will be understood that multiple units may be constructed with compartments horizontally linked or stacked vertically.

As seen in FIG. 1 metal container 12 has an outer wall 16, a bottom wall 18 and a lid 20; formed of sheet steel or the like. Outer wall 16 has a top edge 22 and a bottom edge 24 with bottom edge 24 joined as by welding to bottom wall 18 to define an open topped cavity. Outer wall 16 is formed of sections 26 which are welded together and has an access opening 28 along bottom wall 18 to simulate a doorway. Outer wall 16 also has a peripheral flange 30 below top edge 22. Lid 20 is generally constructed and arranged to cooperate with outer wall 16 and bottom wall 18 to enclose an internal cavity. To that end, lid 20 has a top panel 32 with an under surface 34 and a skirt 36. As illustrated, skirt 36 is stepped with an inner perimeter 38 and an outer perimeter 40. A handle 42 is provided on an upper surface 44 of top panel 32 for installing lid 20 on peripheral flange 30 of outer wall 16 as described below.

Combustible liner 14 as best seen in FIG. 3 has a plurality of side panels 46, a bottom panel 48 and a top panel 50; formed of particle board or other similar combustible material and the parts loosely fitted together. Bottom panel 48 is sized such that it fits inside outer wall 16 and rests on bottom wall 18 of metal container 12. Side panels 46 have an upper edge 52 and a lower edge 54 with lower edge 54 resting on bottom panel 48. In the form illustrated, metal container 12 is cuboidal and there are four equal sized side panels 46 but it will be understood that outer wall 16 of metal container 12 may be five-sided, etc. which determines the shape and size of side panels 46 which line the inside of the container. While side panels 46 could be lap jointed or jointed with a biscuit, glued or stapled, in the form illustrated they are loosely butt jointed as there is no incentive or need to form an air tight seal. With continuing reference to FIG. 3, one of side panels 46 has an opening 56 which as shown in FIG. 1 is in registry with access opening 28 in outer wall 16 of metal container 12. Upper edge 52 of side panels 46 extends above top edge 22 of outer wall 16. Two adjacent panels are shortened such that their upper edge 52 forms a support 58 into which top panel 50 is fitted such that a top surface 60 of top panel 50 is flush with upper edge 52 of the other panels, thus closing the liner.

Top panel 50 of combustible liner 14 is fitted inside inner perimeter 38 of skirt 36 with outer wall 16 of metal container 12 fitted inside outer inner perimeter 40 of skirt 36 and with a lower edge 62 of skirt 36 resting on peripheral flange 30 of outer wall 16. As shown in the drawings, skirt 36 may be stepped. While lid 20 is set upon but not sealed to peripheral flange 30, side panels 46 block the air flow and when skirt 36 is stepped, inner perimeter 38 forms a pocket into which the top of combustible liner 14 is received. With this arrangement the air pathway to combustible liner 14 is blocked other than through access opening 28 in outer wall 16. Portable unit 10 as shown in the drawings is generally cuboidal and is about 16 inches in width, depth and height. It will be understood, however, that unit 10 may be larger and still be portable depending on the thickness of the sheet metal used to make container 12 or smaller.

In use, combustible liner 14 is installed in metal container 12 and lid 20 placed on peripheral flange 30. Combustible material is placed in a corner of the cavity and a small fire is lit as shown in FIG. 4A to simulate a single compartment fire with a single ventilation point (access opening 28).

Students are able to observe the various phenomena associated with a developing fire. In the early stages of fire growth, the unburned products of combustion (smoke and carbon particulates) streaming out of access opening 28 may be ignited to demonstrate their flammability. Unit 10 may also be used by an instructor during the development of the fire to simulate various hose stream techniques using small spray bottles filled with water. Unit 10 may also be provided with secondary access openings 64, 66 with removable covers to simulate a broken window or a vent hole in the roof for the purpose of demonstrating the effect of various air flow patterns on the development of the fire.

As the session progresses, the firefighters may observe the fire flashing over as shown in FIG. 4B to become a fully developed fire. The instructor may then demonstrate a backdraft by covering access opening 28 with a cover 68 as shown in FIG. 4C. When cover 68 is removed, fresh air flows into unit 10 which in ordinary course results in a fireball shooting out of access opening 28 with a 'whoooompf' or a 'bang' as the fire gases burn off as shown in FIG. 4D in a plentiful supply of oxygen. The demonstration is dramatic and for the firefighters being trained, unit 10 is the closest that they will ever want to be to a backdraft. Since unit 10 is portable and relatively inexpensive to make, unit 10 allows fire fighting training effectively to be brought into the field without limitation by cost, time and/or logistics.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A portable firefighting training unit comprising a metal container and a combustible liner, said metal container having an outer wall, a bottom wall, and a lid, said outer wall having a top edge and a bottom edge, said bottom edge joined to the bottom wall to define an open cavity, said outer wall having an access opening along the bottom wall and a peripheral flange positioned above the access opening and below the top edge; and said combustible liner having our side panels and a bottom panel, said side panels and said bottom panel lining the metal container, said side panels each having an upper edge and a lower edge, said lower edges of the side panels resting on the bottom panel of the liner, said side panels butted together and butted against the bottom panel of the liner and the outer wall of the metal container, one of said side panels having an opening in registry with the access opening in the outer wall of the metal container, whereby an air pathway to the combustible liner is blocked other than through the access opening in the outer wall of the metal container.

2. The unit of claim 1 wherein the metal container is formed of sheet steel.

3. The unit of claim 1 wherein the liner is formed of particle board.

4. The unit of claim 1 further comprising a cover for blocking the air pathway through the access opening.

5. A portable firefighting training unit comprising a cuboidal metal container formed of sheet steel and a combustible liner formed of particle board, said metal container having an outer wall, a bottom wall, and a lid, said outer wall having a top edge and a bottom edge, said bottom edge welded to the bottom wall to define an open cavity, said outer wall having an access opening along the bottom wall and a peripheral flange positioned above the access opening and below the top edge; and said combustible liner having four side panels and a bottom panel, said side panels each having an upper edge and a lower edge, said side panels butt jointed together without fasteners and butted against the outer wall of the metal container with the lower edges resting on the bottom panel of the liner, one of said side panels having an opening in registry with the access opening in the outer wall of the metal container, whereby an air pathway into the unit is blocked other than through the access opening in the outer wall of the metal container.

6. The unit of claim 5 wherein a handle is provided on an outer surface of the lid.

7. The unit of claim 5 wherein the cuboidal metal container is about 16 inches in width, depth and height.

8. The unit of claim 5 further comprising a cover for blocking the air pathway through the access opening.

9. The unit of claim 5 further comprising a second access opening simulating a roof vent.

10. The unit of claim 5 further comprising a second access opening simulating a window.

* * * * *